(12) United States Patent
Persson et al.

(10) Patent No.: US 6,736,574 B2
(45) Date of Patent: May 18, 2004

(54) INSERT HOLDER HAVING ADJUSTABLE INSERT SEAT PLATE

(75) Inventors: Conny Persson, Sandviken (SE); Rolf Hagberg, Tyresö (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/097,269

(22) Filed: Mar. 15, 2002

(65) Prior Publication Data

US 2002/0131829 A1 Sep. 19, 2002

(30) Foreign Application Priority Data

Mar. 15, 2001 (SE) .............................................. 0100890

(51) Int. Cl.⁷ .............................................. B23B 27/00
(52) U.S. Cl. .......................................... 407/77; 407/85
(58) Field of Search .............................. 407/85, 86, 87, 407/91, 103, 104, 77, 110, 88

(56) References Cited

U.S. PATENT DOCUMENTS

| 2,623,272 A | * | 12/1952 | Greenleaf | 407/79 |
| 3,466,721 A | * | 9/1969 | Binns | 407/70 |
| 3,576,060 A | * | 4/1971 | Stein | 407/117 |
| 3,611,527 A | * | 10/1971 | Hudson | 407/86 |
| 4,035,890 A | | 7/1977 | Eriksson et al. | |
| 4,533,283 A | | 8/1985 | Satran et al. | |
| 4,667,713 A | * | 5/1987 | Wright | 144/231 |
| 4,714,384 A | | 12/1987 | Lagerberg | |
| 4,730,525 A | | 3/1988 | Kelm | |
| 4,848,199 A | * | 7/1989 | Kelm | 82/159 |
| 5,064,317 A | * | 11/1991 | Gardner | 407/70 |
| 5,183,089 A | * | 2/1993 | Norlander et al. | 144/231 |
| 5,810,518 A | * | 9/1998 | Wiman et al. | 407/102 |
| 5,924,826 A | * | 7/1999 | Bystrom et al. | 407/103 |
| 6,481,936 B1 | * | 11/2002 | Hecht | 407/111 |
| 2003/0091398 A1 | * | 5/2003 | Nolan et al. | 407/13 |

FOREIGN PATENT DOCUMENTS

EP 1 025 939 8/2000

* cited by examiner

*Primary Examiner*—A. L. Wellington
*Assistant Examiner*—Brian D. Walsh
(74) *Attorney, Agent, or Firm*—Burns, Doane, Swecker & Mathis, LLP

(57) ABSTRACT

An insert holder includes a head having ridge teeth, and an insert seat plate seated on the head such that ridge teeth thereof mesh with the ridge teeth of the head. The plate forms a V-shaped recess in which a cutting insert is to be received. The recess thus defines a position of support for the insert. A bisector of the V-shaped recess extends parallel to the ridge teeth. The insert seat plate is adjustable in the direction of the bisector (e.g., by individually deployable spacer plates of different thickness) to adjust the position of support defined by the V-shaped recess.

15 Claims, 4 Drawing Sheets

1

INSERT HOLDER HAVING ADJUSTABLE INSERT SEAT PLATE

This application claims priority under 35 U.S.C. §§119 and/or 365 to Patent Application Serial No. 0100890-3 filed in Sweden on Mar. 15, 2001, the entire content of which is hereby incorporated by reference.

TECHNICAL FIELD OF THE INVENTION

The present invention relates to an insert holder for cutting inserts for chip removing machining, whereby the insert holder comprises a head, an insert seat plate having a V-formed recess mounted on the head which defines side surfaces, against which side edges of the cutting insert are intended to abut when the cutting insert is mounted in the insert holder.

PRIOR ART

An indexable tool for chip forming machining is known previously from EP-A-0 248 205 (corresponding to U.S. Pat. No. 4,730,525). Said tool features a replaceable insert seat plate, which in turn features a V-formed recess, in which a cutting insert is intended to be received. The insert seat plate may be displaced in the longitudinal direction of the tool by an eccentric mechanism, whereby said displacement generates an indexing of the cutting insert of a quarter of a revolution so that an unused cutting edge of the cutting insert assumes an active position. The indexing of the cutting insert is achieved by a claw-formed member attached under the insert seat plate, and arranged for turning the pin to which the cutting insert is firmly connected. Said claw-formed member is displaced in the longitudinal direction of the tool together with the insert seat plate. However, the V-formed recess always returns to the same position in which it supports the insert and thus the side edges of the V-formed recess are not adjustable in order to adapt to the side surfaces of the cutting insert.

AIMS AND FEATURES OF THE INVENTION

A primary aim of the present invention is to provide an insert holder of the type described above, where an exceptionally accurate clamping of the cutting insert in the cutting seat is obtained, notwithstanding that the cutting insert is exposed to varying loads and/or loading directions during, for instance, copying lathing. The consequence of this is an increased dimensional precision during use of the tool holder.

Another aim of the present invention is that the side edges of the V-formed recess may be made to conform to the side surfaces of the cutting insert, whereby a four point abutment is guaranteed.

Yet another aim of the present invention is that the V-formed recess should be secured to the head of the tool with exceptional stability.

Yet another aim of the present invention is to provide an insert holder which in a simple and inexpensive way may be adapted to a number of different cutting insert shapes and cutting insert sizes.

At least the primary aim of the present invention is realised by an insert holder which is adapted to hold a cutting insert for chip removing machining. The holder comprises a head, an insert seat plate, and an adjusting means. The head includes a first surface having a first ridge tooth arrangement. The insert seat plate has a second surface seated on the first surface. The second surface has a second ridge tooth arrangement meshed with the first ridge tooth arrangement. The insert seat plate forms a V-shaped recess adapted to receive a cutting insert and defining a position of support therefor. The recess defines a bisector which extends substantially parallel to the first and second ridge tooth arrangements. The adjusting means is provided for adjusting the insert seat plate in the direction of the bisector, wherein the position of support defined by the V-shaped recess is correspondingly adjusted.

Preferably, the holder includes a support surface which is upstanding relative to the first surface. The adjusting means comprises exchangeable spacer plates of different thickness which are individually depolyable between the support surface and the insert seat plate.

BRIEF DESCRIPTION OF THE DRAWINGS

A preferred embodiment of the invention will be described below with reference to the appended drawings, wherein.

DETAILED DESCRIPTION OF PREFERRED EMBODIMENTS OF THE INVENTION

Figure 1:
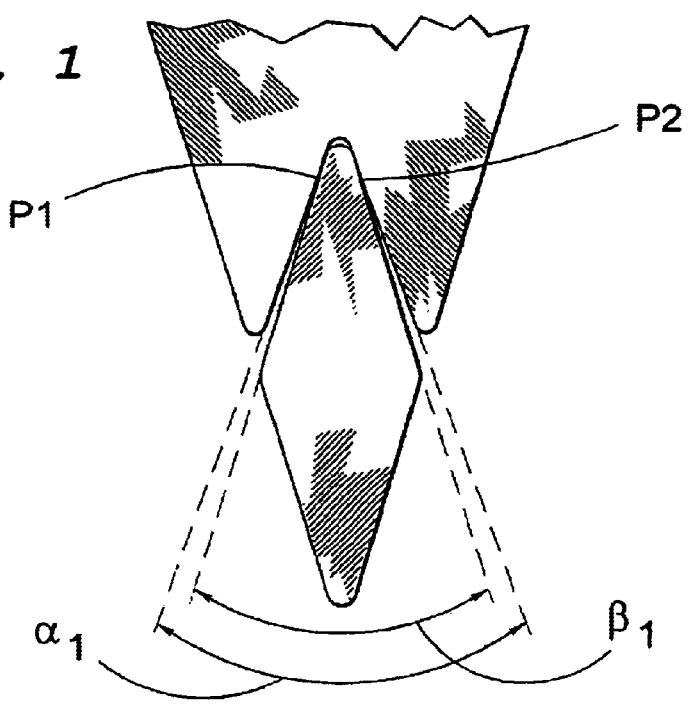
FIG. 1 schematically shows, in an exaggerated scale, a first extreme case when a cutting insert is received in an insert holder according to the present invention.

In the cooperation between a cutting insert and the insert seat plate of an insert holder according to the present invention as illustrated schematically in FIG. 1, the two contact points P1 and P2, between the cutting insert and the insert seat plate, are situated in the area of the tip of the V-formed recess which the insert seat plate presents. In that connection, the contact points P1 and P2 are opposite, i.e. they are located on respective side walls of the V-formed recess. Thus, in the typical case illustrated in FIG. 1, the nose angle $\alpha_1$ of the V-formed recess is somewhat larger than the nose angle $\beta_1$ of the cutting insert.

Figure 2:
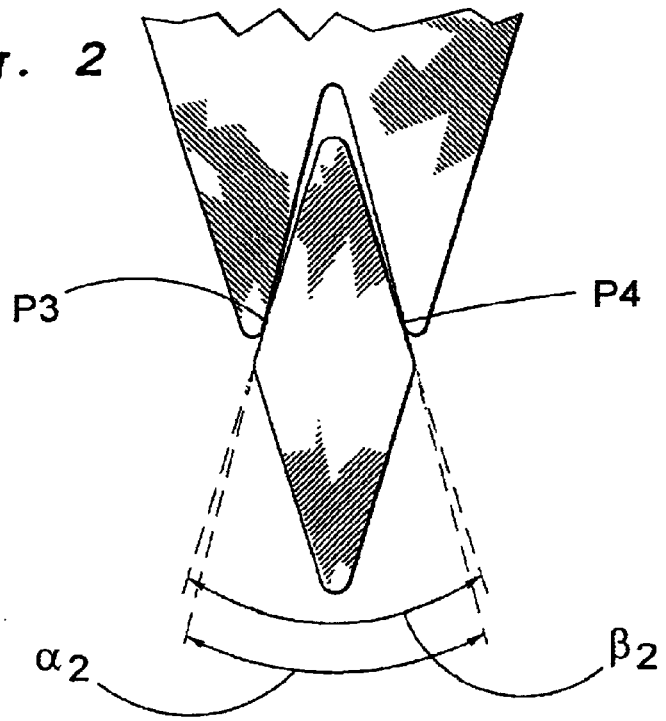
FIG. 2 schematically shows, in an exaggerated scale, a second extreme case when a cutting insert is received in an insert holder according to the present invention.

In the cooperation between a cutting insert and the insert seat plate of an insert holder according to the present invention as shown schematically in FIG. 2, the two contact points P3 and P4, between the cutting insert and the insert seat plate, are situated in the area of the opening of the V-formed recess, whereby the contact points P3 and P4 also in this case are opposite, i.e., they are located on respective side walls of the V-formed recess. Thus, in the typical case illustrated in FIG. 2, the nose angle $\alpha_1$ of the V-formed recess is somewhat smaller than the nose angle $\beta_2$ of the cutting insert.

Figure 3:
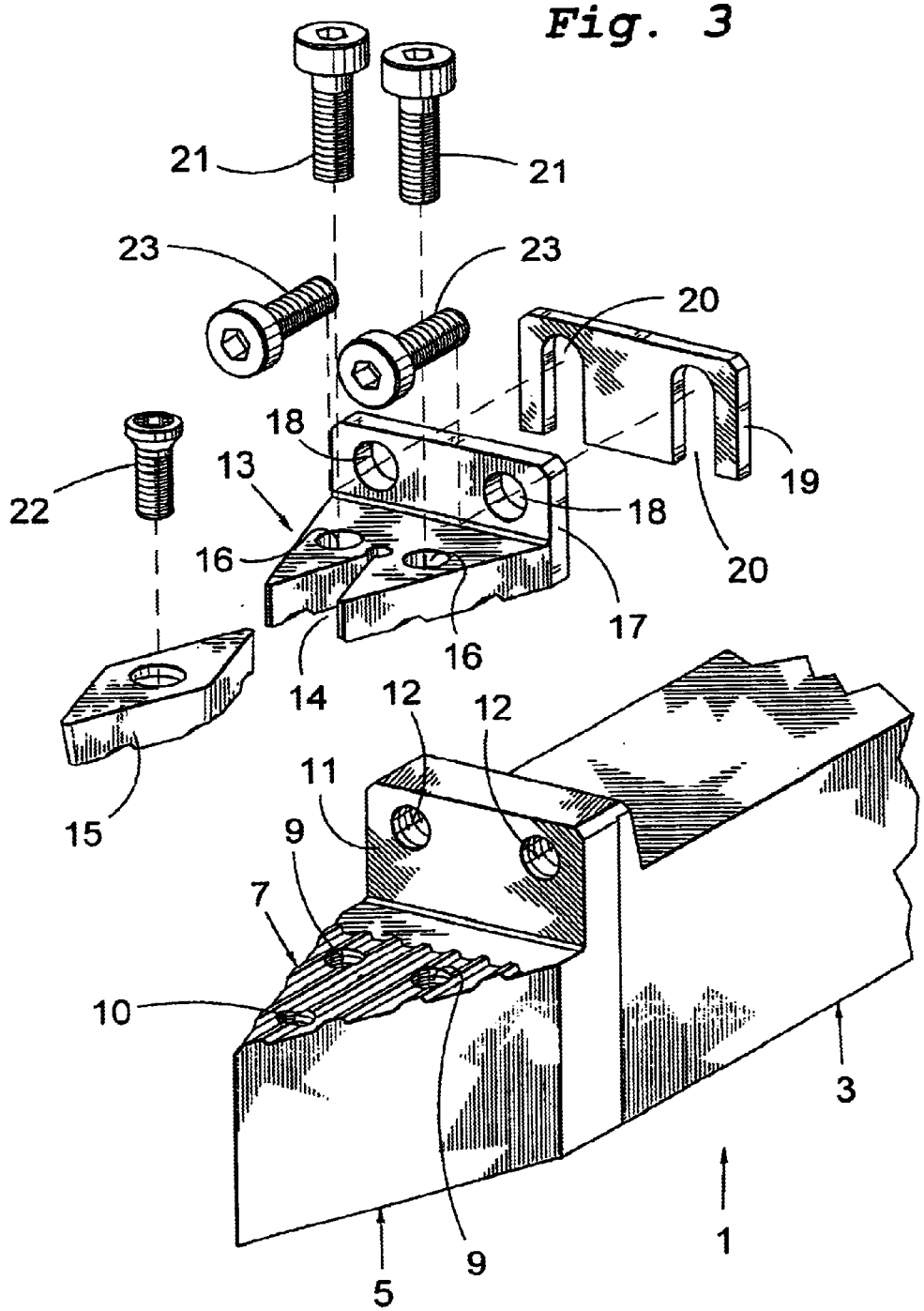
FIG. 3 shows in perspective an exploded view of an insert holder according to the present invention.

The insert holder according to the present invention illustrated in FIG. 3 comprises a basic holder 1, which in turn comprises a shaft 3 as well as a head 5. In the illustrated embodiment, the shaft 3 has a square cross-section. The head 5 has, in planar view, a generally triangular shape, whereby the nose angle of the free end of the head 5 in principle equals the nose angle of the cutting insert which the head 5 is intended to carry.

Since the insert holder according to the present invention is especially intended for copying inserts, the nose angle in question is relatively small. As is seen in FIG. 3, the head 5 is, on the upwardly turned side thereof, provided with first ridge teeth 7. In the surface of the head 5 which carries the ridge teeth 7, two first holes 9 and a second hole 10 are arranged, whereby all said holes are internally threaded.

An upstanding support surface 11 is arranged between the shaft 3 and the head 5, whereby said support surface 11 has an extension mainly perpendicular to the plane in which the ridge teeth are located. The support surface 11 is provided with two third holes 12, which are internally threaded.

The insert holder according to FIG. 3 also includes an insert seat plate 13, which comprises a V-shaped recess 14, in which a cutting insert 15 for chip removing machining is intended to be received. The recess 14 thus defines a position of support for the insert. In the insert seat plate 13, two fourth holes 16 are formed, whereby said fourth holes 16 are somewhat oval and preferably have smooth walls. The long dimension of the oval holes 16 is oriented such that the insert seat plate 13 may be displaced in the longitudinal direction of the basic holder 1 in order to adjust the position of support defined by the recess 14, as will be explained. The insert seat plate 13 is also provided with an upstanding support wall 17, which has a general extension perpendicular to the main plane of the insert seat plate 13. The support wall 17 is provided with two fifth holes 18, which preferably have smooth walls.

The insert holder according to FIG. 3 also comprises a spacer plate 19, which is intended to be attached between the support surface 11 and the support wall 17. The function of the spacer plate 19 will be described below. As is seen in FIG. 3, the spacer plate 19 is provided with two recesses 20, the upper rounded portions of which may be brought to coincide with the upper rounded portions of the third and fifth holes 12 and 18, respectively. In practice, a plurality of spacer plates 19 of different thickness will be provided which are individually deployable between the support surface 11 and the wall 17, as will become apparent.

In order to firmly secure the insert seat plate 13 to the head 5 in a satisfactory way, the insert holder also has a number of screws. Thus, the insert holder comprises two first screws 21, which are intended to extend through the oval holes 16 and be received in the first holes 9 of the part of the head 5 which carries ridge teeth 7. The insert holder also comprises two third screws 23, which are intended to extend through the holes 18 and the recesses 20 and be received in the third holes 12.

In order to fix the cutting insert 15 in the V-formed recess 14 of the insert seat plate 13, the insert holder also comprises a second screw 22, which is intended to extend through a center hole of the insert and be received in the second hole 10 of the head 5.

Figure 4:
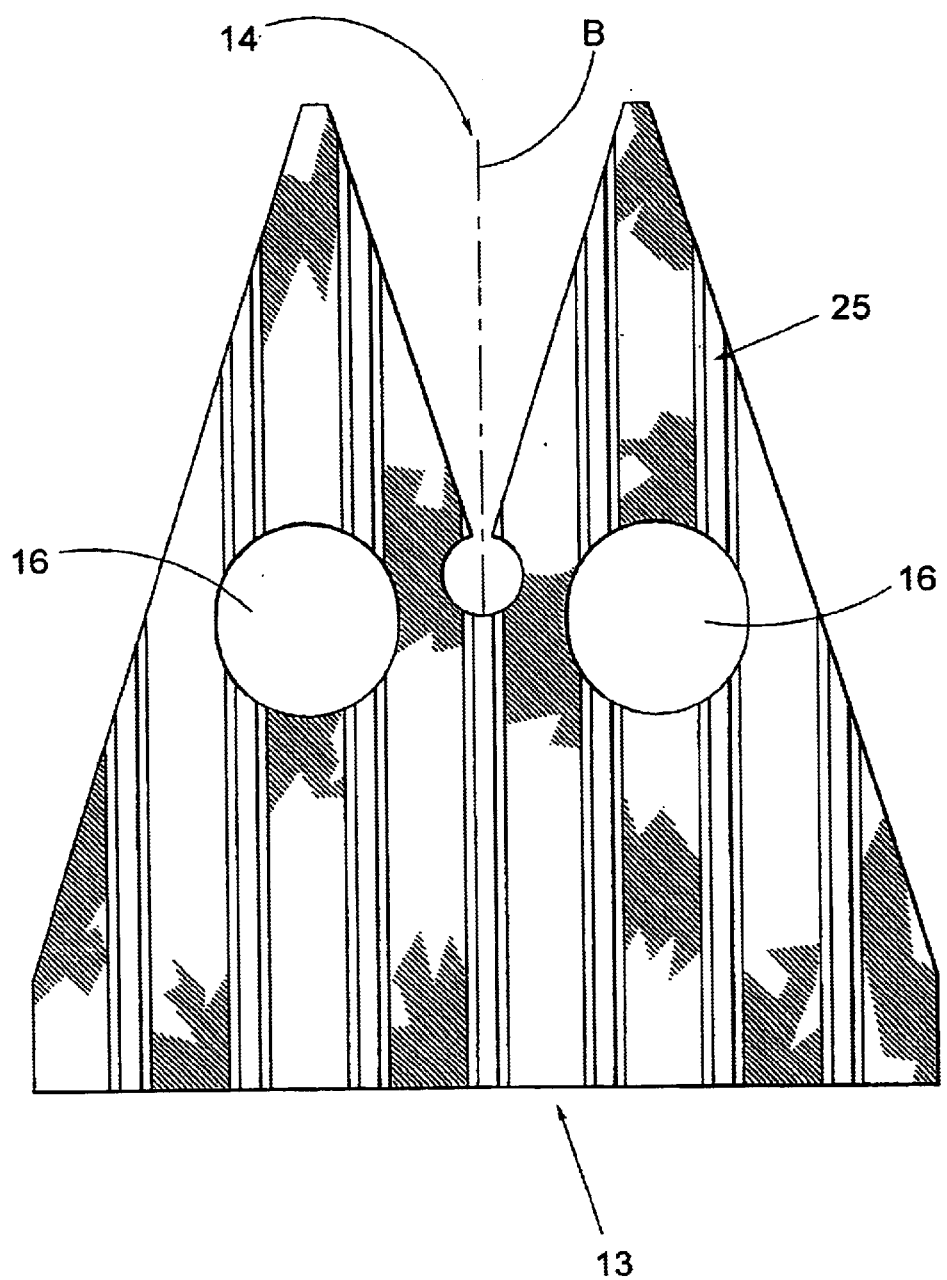
FIG. 4 shows a view from below of an insert seat plate included in the insert holder.

As is seen in FIG. 4, the insert seat plate 13, on the bottom side thereof, is provided with second ridge teeth 25, which are intended to mesh with the first ridge teeth 7 of the head 5. As is seen in FIG. 3, the ridge teeth 7 are disposed on the portion of the head that is intended to carry the cutting insert 15. Accordingly, in the embodiment of the insert holder according to the invention shown in FIG. 3, the cutting edge 15 is provided with ridge teeth on the bottom side thereof. This is indicated in FIG. 3.

The ridge teeth 7, 25 have a direction which is mainly parallel to the direction of a bisector B of the V-shaped recess (see FIG. 4). The same is also valid for the ridge teeth on the bottom side of the cutting insert 15. That is, in the mounted position of the cutting insert 15, the ridge teeth thereof are parallel to the ridge teeth 7, 25.

Figure 5:
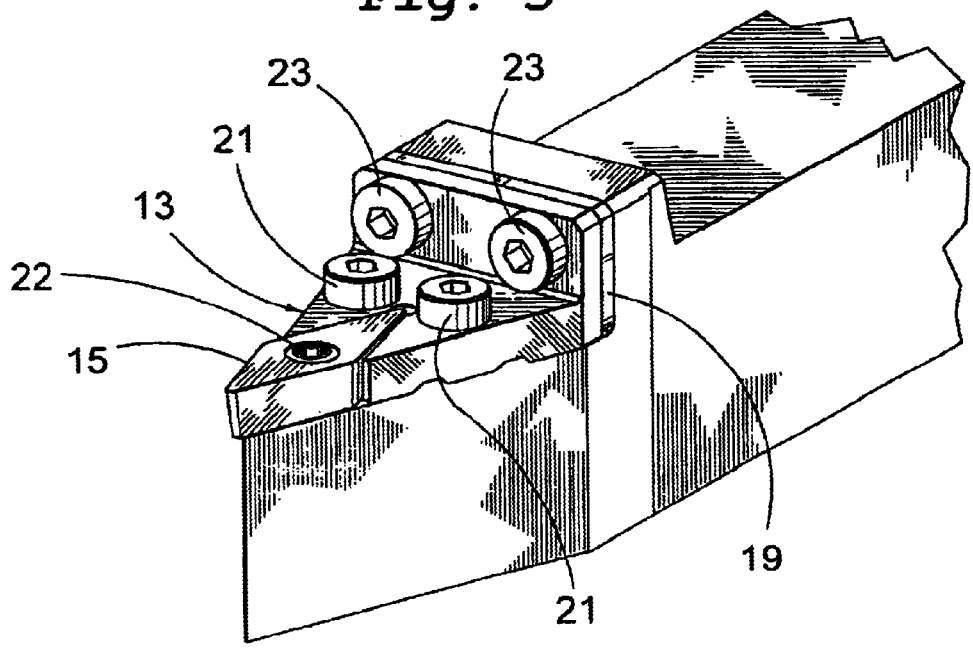
FIG. 5 shows in perspective an assembled insert holder according to the present invention.

In FIG. 5, the insert holder according to the present invention is shown in an assembled state. In this connection, the first screws 21 go through the fourth holes 16, and are received in the first holes 9. The third screws 23 go through the fifth holes 18 and the recesses 20, whereupon the third screws are received in the third holes 12. The cutting insert 15 is firmly fixed by means of the second screw 22, which is received in the second hole 10.

By studying FIG. 5, it is understood that depending on the thickness of the deployed spacer plate 19, the position of the insert seat plate 13 on the head 5 will be effected. Thus, by replacing one spacer plate 19 with a thicker spacer plate, the insert seat plate 13 is displaced towards the free tip of the head 5, i.e., the position of support defined by the recess 14 is disposed toward that free tip. The varying position of the insert seat plate 13 in turn affects the clamping of the cutting insert 15. Thus, different thicknesses of the spacer plate 19 ensure an optimization of the pre-tension by which the second screw 22 forces the insert against the side walls of the V-shaped recess in order to clamp the cutting insert 15 on the insert holder. The pre-tensioning is an important parameter for minimizing the movement of the insert. If the insert seat plate 13 is displaced relatively far out towards the tip of the head 5, the pre-tension of the second screw 22 will become stronger. Correspondingly, the pre-tension becomes smaller if the insert seat plate 13 is displaced a relatively shorter distance towards the tip of the head 5. Thanks to the spacer plate 19 being provided with recesses 20, the insert seat plate 13 does not need to be entirely dismounted when the spacer plate 19 is replaced. Thus, it is sufficient that the first screws 21 and the third screws 23 are loosened, whereupon the spacer plate 19 may be removed and replaced by a spacer plate 19 having a different thickness.

The dismountable insert seat plate 13 makes precision manufacturing possible, especially in regards of the V-shaped recess 14, by means of milling or alternative methods, for instance electro-sparking, casting or grinding. Thereby, the support surfaces for the cutting insert 15 of the V-shaped recess 14 may be optimized, which ensures a small clearance in the recess 14.

The dismountable insert seat plate 13 also ensures that the shaft/head 3, 5 can be formed of a different material than the cutting seat holder 13. Thus, a stronger/harder material, for instance cemented carbide, may be used in the insert seat plate 13, whereby movement of the cutting insert and plastic deformation thereof are minimized.

The dismountable insert seat plate 13 also facilitates changing to a different cutting insert shape, for instance from a cutting insert having a nose angle of 35° to a cutting insert having a nose angle of 55°. In that connection, an insert seat plate 13 is selected whose V-shaped recess 14 fits the cutting insert 15 being used.

Figure 6:
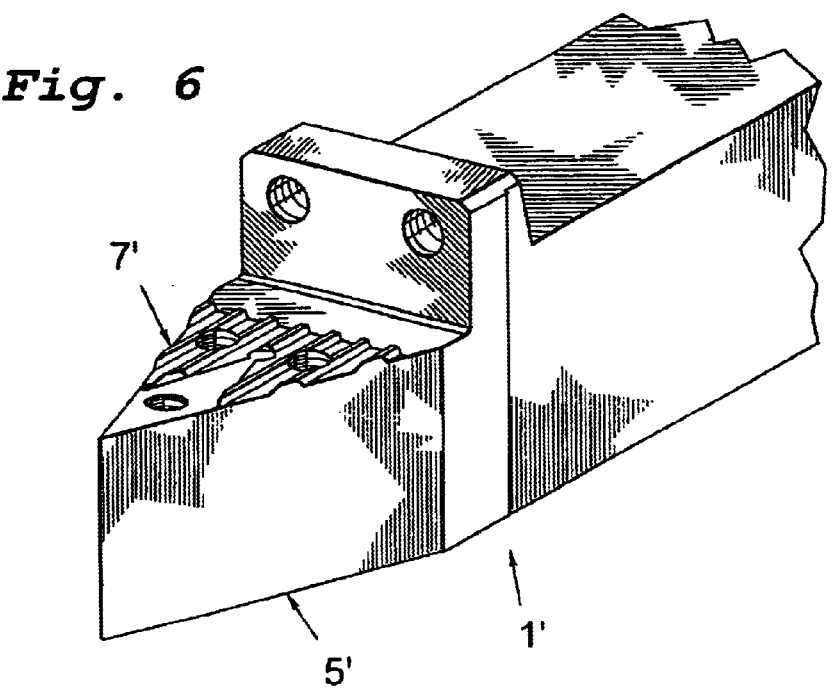
FIG. 6 shows a perspective view of an alternative embodiment of a head of the insert holder.

In FIG. 6, an alternative embodiment of a basic holder 1' according to the present invention is shown. Said embodiment principally differs from the embodiment according to FIG. 3 in that the surface of the head 5', which carries the insert seat plate 13 and the cutting insert 15', is only partly provided with ridge teeth 7'. Thus, said surface is provided with ridge teeth 7' only on the portion which is intended to cooperate with the insert seat plate 13. In this connection, it should be pointed out that the shape of the insert seat plate 13 may be the same regardless of whether it is to be used together with the basic body according to FIG. 3 or the basic body according to FIG. 6.

Thus, the head 5' according to FIG. 6 lacks ridge teeth on the surface area which is intended to receive a cutting insert for chip removing machining. Said alternative embodiment of the head 5' enables the use of cutting inserts of a standard design, i.e., such cutting inserts, which are not provided with ridge teeth on the bottom side thereof.

FEASIBLE MODIFICATIONS OF THE INVENTION

In the embodiments described above, the insert holder is provided with a replaceable spacer plate 19, by means of which the pre-tension of the screw 22 which fixes the cutting insert 15 may be adjusted. That is a structurally simple solution for achieving said adjustment. However, within the scope of the present invention, alternative adjusting means may be provided to achieve an adjustment of the pre-tension, i.e. in the present ease a displacement of the position of the insert seat plate 13. Thus, it may be conceived that there is an adjusting mechanism between the insert seat plate 13 and the side surface 11, by means of which a displacement of the insert seat plate 13 may be effected. Said adjusting mechanism may, for instance, comprise one or more set screws which would be adjusted after the screws 21, 23 have been loosened.

According to the embodiments described above in FIGS. 3–6, the cutting insert 15 is applied directly on the head 5 of the basic holder 1. However, within the scope of the invention it is also conceivable that a shim plate could be arranged between the cutting insert 15 and the head 5. In that connection, the thickness of the insert seat plate 13 could remain as shown, and the shim plate could be countersunk in the head 5. Alternatively, the shim plate could be placed on top of the head 5, with the insert seat plate 13 having a greater height than is shown. In case a shim plate is used, the direction of the ridge teeth between the cutting seat and the shim plate may be different than the direction of the ridge teeth between the insert seat plate 13 and the head 5.

What is claimed is:

1. An insert holder adapted to hold a cutting insert for chip removing machining, comprising:
   a head including a first surface having a first ridge tooth arrangement;
   an insert seat plate having a second surface seated on the first surface, the second surface having a second ridge tooth arrangement meshed with the first ridge tooth arrangement, the insert seat plate forming a recess which is generally V-shaped as the insert seat plate is viewed in a direction perpendicular to the second surface, the V-shape defining an apex, the recess adapted to receive a cutting insert and defining a position of support therefor, the recess defining a bisector extending through the apex substantially parallel to the first and second ridge tooth arrangements; and
   adjusting means for adjusting the insert seat plate in the direction of the bisector, wherein the position of support defined by the V-shaped recess is correspondingly adjusted.

2. The insert holder according to claim 1 wherein the head includes member-receiving means for receiving an insert-clamping member, the insert seat plate being adjustable relative to the member-receiving means in the direction of the bisector.

3. The insert holder according to claim 2 wherein the member-receiving means comprises a threaded hole formed in the first surface for receiving an insert-clamping member in the form of a screw.

4. The insert holder according to claim 1 wherein the holder includes a support surface upstanding relative to the first surface, the adjusting means comprising exchangeable spacer plates of different thickness individually deployable between the support surface and the inset seat plate.

5. The insert holder according to claim 4 wherein the spacer plates are exchangeable with one another while the insert seat plate remains connected to the head.

6. The insert holder according to claim 5 wherein the insert seat plate is secured to the support surface by a screw passing through a recess formed in the deployed spacer plate, the recess being open at one end to enable the spacer plate to be slid out from between the support surface and the insert seat plate.

7. The insert holder according to claim 1 further including screws for securing the insert seat plate to the head.

8. The insert according to claim 1 wherein the first ridge tooth arrangement comprises a plurality of parallel first ridge teeth, and the second ridge tooth arrangement comprises a plurality of parallel second ridge teeth.

9. The insert holder according to claim 8 wherein the first ridge teeth are disposed in an insert-receiving portion of the first surface adapted to receive a cutting insert.

10. The insert holder according to claim 9, further including a cutting insert mounted on the insert-receiving portion and including third ridge teeth meshing with the first ridge teeth.

11. The insert holder according to claim 8 wherein an insert-receiving portion of the first surface adapted to receive a cutting insert is free of the first ridge teeth.

12. The insert holder according to claim 1 wherein the insert seat plate comprises a harder material than the head.

13. An insert holder adapted to hold a cutting insert for chip removing machining, comprising:
   a head including a first surface having parallel first ridge teeth and first and second threaded holes;
   a support surface upstanding from the first surface and including a third threaded hole;
   an insert seat plate having a second surface seated on the first surface, the second surface having parallel second ridge teeth meshed with the first ridge teeth, the insert seat plate forming a V-shaped recess adapted to receive a cutting insert and defining a position of support therefor, the recess defining a bisector extending substantially parallel to the first and second ridge teeth;
   a first screw receivable in the first threaded hole for securing the insert seat plate to the head;
   a second screw receivable in the second threaded hole for securing an insert to the head;
   a third screw receivable in the third threaded hole for securing an upstanding portion of the insert seat plate to the upstanding portion of the holder; and
   exchangeable spacer plates of different thickness individually deployable between the support surface and the insert seat plate for adjusting the insert seat plate in the direction of the bisector, wherein the position of support defined by the V-shaped recess is correspondingly adjusted, each spacer plate including a recess through which the third screw extends, the groove being open at one end thereof to enable the deployed spacer plate to be removed and replaced while the insert seat plate remains connected to the head.

14. An insert holder adapted to hold a cutting insert for chip removing machining, comprising:
   a head including a first surface having a first ridge tooth arrangement;

an insert seat plate having a second surface seated on the first surface, the second surface having a second ridge tooth arrangement meshed with the first ridge tooth arrangement, the insert seat plate forming a V-shaped recess adapted to receive a cutting insert and defining a position of support therefor, the recess defining a bisector extending substantially parallel to the first and second ridge tooth arrangements; and adjusting means for adjusting the insert seat plate in the direction of the bisector, wherein the position of support defined by the V-shaped recess is correspondingly adjusted;

the holder further including a support surface upstanding relative to the first surface;

the adjusting means comprising exchangeable spacer plates of different thickness individually deployable between the support surface and the inset seat plate, wherein the spacer plates are exchangeable with one another while the insert seat plate remains connected to the head.

15. An insert holder adapted to hold a cuffing insert for chip removing machining, comprising:

a head including a first surface having a first ridge tooth arrangement;

an insert seat plate having a second surface seated on the first surface, the second surface having a second ridge tooth arrangement meshed with the first ridge tooth arrangement, the insert seat plate forming a V-shaped recess adapted to receive a cutting insert and defining a position of support therefor, the recess defining a bisector extending substantially parallel to the first and second ridge tooth arrangements; and adjusting means for adjusting the insert seat plate in the direction of the bisector, wherein the position of support defined by the V-shaped recess is correspondingly adjusted;

wherein the insert seat plate comprises a harder material than the head.

* * * * *